United States Patent
Kiyokami et al.

(10) Patent No.: US 9,193,349 B2
(45) Date of Patent: Nov. 24, 2015

(54) HYBRID VEHICLE DRIVE CONTROLLER

(75) Inventors: Hiroaki Kiyokami, Toyota (JP); Koki Ueno, Susono (JP); Yoshiteru Hagino, Nisshin (JP); Satoru Takahashi, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/387,616

(22) PCT Filed: Mar. 26, 2012

(86) PCT No.: PCT/JP2012/057814
§ 371 (c)(1),
(2), (4) Date: Sep. 24, 2014

(87) PCT Pub. No.: WO2013/145095
PCT Pub. Date: Oct. 3, 2013

(65) Prior Publication Data
US 2015/0094188 A1     Apr. 2, 2015

(51) Int. Cl.
*B60W 10/08*   (2006.01)
*B60W 20/00*   (2006.01)
*B60K 6/445*   (2007.10)
*B60K 6/387*   (2007.10)
*B60W 10/02*   (2006.01)
*B60W 10/12*   (2012.01)
*B60W 10/196*  (2012.01)
*B60K 6/38*    (2007.10)

(52) U.S. Cl.
CPC ............ *B60W 20/00* (2013.01); *B60K 6/387* (2013.01); *B60K 6/445* (2013.01); *B60W 10/02* (2013.01); *B60W 10/08* (2013.01); *B60W 10/12* (2013.01); *B60W 10/196* (2013.01); *B60W 20/106* (2013.01); *B60K 2006/381* (2013.01); *Y02T 10/6239* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 6,478,705 B1 * | 11/2002 | Holmes et al. | 475/5 |
| 7,261,659 B2 * | 8/2007 | Raghavan et al. | 475/5 |
| 7,276,007 B2 * | 10/2007 | Takami et al. | 475/5 |
| 7,473,199 B2 * | 1/2009 | Bucknor et al. | 475/5 |
| 7,998,016 B2 * | 8/2011 | Si et al. | 475/284 |
| 8,088,034 B2 * | 1/2012 | Imamura et al. | 477/3 |

(Continued)

FOREIGN PATENT DOCUMENTS

| | | |
|---|---|---|
| JP | 2005-081932 A | 3/2005 |
| JP | 2005-199942 A | 7/2005 |

(Continued)

*Primary Examiner* — Dirk Wright
(74) *Attorney, Agent, or Firm* — Sughrue Mion, PLLC

(57) ABSTRACT

A drive control device for a hybrid vehicle is provided with a differential device including four rotary elements; and an engine, a first electric motor, a second electric motor and an output rotary member which are respectively connected to the four rotary elements. One of the four rotary elements is constituted by a rotary component of a first differential mechanism and a rotary component of a second differential mechanism which are selectively connected to each other through a clutch, and one of the rotary components of the first and second differential mechanisms which are selectively connected to each other through the clutch is selectively fixed to a stationary member through a brake. The drive control device comprises: a clutch engagement control portion configured to place the clutch in an engaged state when a warm-up operation of the hybrid vehicle is required.

5 Claims, 10 Drawing Sheets

(56) References Cited

U.S. PATENT DOCUMENTS

| | | |
|---|---|---|
| 8,226,514 B2 * | 7/2012 | Grochowski et al. ............. 475/5 |
| 8,226,515 B2 * | 7/2012 | Phillips ............................ 475/5 |
| 8,231,490 B2 * | 7/2012 | Park et al. ........................ 475/5 |
| 8,313,401 B2 * | 11/2012 | Kim et al. ........................ 475/5 |
| 8,342,996 B2 * | 1/2013 | Grochowski et al. ............. 475/5 |
| 8,460,142 B2 * | 6/2013 | Wittkopp et al. ................. 475/5 |
| 8,915,815 B2 * | 12/2014 | Choi et al. ........................ 475/5 |
| 9,005,078 B2 * | 4/2015 | Hayashi et al. .................. 477/5 |
| 9,085,299 B2 * | 7/2015 | Takahashi et al. .................... 1/1 |
| 2010/0137091 A1 | 6/2010 | Park et al. |
| 2014/0194238 A1 * | 7/2014 | Ono et al. ........................ 475/5 |
| 2014/0194239 A1 * | 7/2014 | Ono et al. ........................ 475/5 |

FOREIGN PATENT DOCUMENTS

| | | |
|---|---|---|
| JP | 4038183 B2 | 1/2008 |
| JP | 2008-265600 A | 11/2008 |
| WO | 2013/014777 A1 | 1/2013 |

* cited by examiner

|  | BK | CL | MODE |
|---|---|---|---|
| EV-1 | O |  | 1 |
| EV-2 | O | O | 2 |
| HV-1 | O |  | 3 |
| HV-2 |  | O | 4 |
| HV-3 |  |  | 5 |

HYBRID VEHICLE DRIVE CONTROLLER

CROSS REFERENCE TO RELATED APPLICATIONS

This application is a National Stage of International Application No. PCT/JP2012/057814, filed Mar. 26, 2012, the contents of all of which are incorporated herein by reference in their entirety.

TECHNICAL FIELD

The present invention relates to an improvement of a drive control device for a hybrid vehicle.

BACKGROUND ART

There is known a hybrid vehicle which has at least one electric motor in addition to an engine such as an internal combustion engine, which functions as a vehicle drive power source. Patent Document 1 discloses an example of such a hybrid vehicle, which is provided with an internal combustion engine, a first electric motor and a second electric motor. This hybrid vehicle is further provided with a brake which is configured to fix an output shaft of the above-described internal combustion engine to a stationary member, and an operating state of which is controlled according to a running condition of the hybrid vehicle, so as to improve energy efficiency of the hybrid vehicle and to permit the hybrid vehicle to run according to a requirement by an operator of the hybrid vehicle.

PRIOR ART DOCUMENT

Patent Document

Patent Document 1: JP-2008-265600 A1
Patent Document 2: JP-4038183 B2

SUMMARY OF THE INVENTION

Object Achieved by the Invention

However, the conventional arrangement of the above-described hybrid vehicle wherein the second electric motor is connected directly to drive wheels has a drawback that the second electric motor cannot be operated to generate an electric energy while the hybrid vehicle is held stationary, for instance. Although it is desirable to improve efficiency of charging of a vehicle driving battery, an improvement of the charging efficiency of the battery with only the first electric motor is limited. This drawback was first discovered by the present inventors in the process of intensive studies in an attempt to improve the performance of the hybrid vehicle.

The present invention was made in view of the background art described above. It is therefore an object of the present invention to provide a drive control device for a hybrid vehicle, which permits reduction of a length of time required for charging the vehicle driving battery.

Means for Achieving the Object

The object indicated above is achieved according to a first aspect of the present invention, which provides a drive control device for a hybrid vehicle provided with: a first differential mechanism and a second differential mechanism which have four rotary elements as a whole; and an engine, a first electric motor, a second electric motor and an output rotary member which are respectively connected to the above-described four rotary elements, and wherein one of the above-described four rotary elements is constituted by the rotary element of the above-described first differential mechanism and the rotary element of the above-described second differential mechanism which are selectively connected to each other through a clutch, and one of the rotary elements of the above-described first and second differential mechanisms which are selectively connected to each other through the above-described clutch is selectively fixed to a stationary member through a brake, the drive control device being characterized by placing the above-described clutch in an engaged state when at least one of the above-described first electric motor and the above-described second electric motor is operated to generate an electric energy.

Advantages of the Invention

According to the first aspect of the invention described above, the hybrid vehicle is provided with: the first differential mechanism and the second differential mechanism which have the four rotary elements as a whole; and the engine, the first electric motor, the second electric motor and the output rotary member which are respectively connected to the four rotary elements. One of the above-described four rotary elements is constituted by the rotary element of the above-described first differential mechanism and the rotary element of the above-described second differential mechanism which are selectively connected to each other through the clutch, and one of the rotary elements of the above-described first and second differential mechanisms which are selectively connected to each other through the clutch is selectively fixed to the stationary member through the brake. The drive control device is configured to place the above-described clutch in the engaged state when at least one of the above-described first electric motor and the above-described second electric motor is operated to generate an electric energy. According to this first aspect of the invention, the first and second electric motors can cooperate with each other to perform an electricity generating operation, so that it is possible to improve battery charging efficiency. Namely, the present invention provides a drive control device for a hybrid vehicle, which permits reduction of a length of time required for charging a vehicle driving battery.

According to a second aspect of the invention, the drive control device according to the first aspect of the invention is configured to place the above-described clutch in the engaged state and to place the above-described brake in a released state when at least one of the above-described first electric motor and the above-described second electric motor is operated to generate an electric energy while the hybrid vehicle is in a stationary or decelerating state. According to this second aspect of the invention, the first and second electric motors can cooperate with each other to perform the electricity generating operation in the stationary or decelerating state of the hybrid vehicle, so that the efficiency of charging of the vehicle driving battery can be improved in a highly practical manner.

According to a third aspect of the invention, the drive control device according to the first aspect of the invention is configured to place the above-described clutch in the engaged state and to place the above-described brake in a released state, and to operate at least one of the above-described first electric motor and the above-described second electric motor with a drive force of the above-described engine, for generating an electric energy, when a warm-up operation of the hybrid vehicle is required. According to this third aspect of the invention, the efficiency of charging of the vehicle driving battery can be improved when the warm-up operation of the hybrid vehicle is required, so that the warm-up operation can be accelerated owing to the efficient charging of the vehicle driving battery.

According to a fourth aspect of the invention, the drive control device according to the first aspect of the invention is configured to place the above-described brake in an engaged state while the above-described clutch is placed in the engaged state, to permit the above-described first electric motor and the above-described second electric motor to be primarily used as a vehicle drive power source, when a warm-up operation of the hybrid vehicle is required while the hybrid vehicle is running. According to this fourth aspect of the invention, the vehicle driving battery can be rapidly discharged when the warm-up operation of the hybrid vehicle is required, so that the warm-up operation can be accelerated.

According to a fifth aspect of the invention, the drive control device according to any one of the first, second, third and fourth aspects of the invention is configured such that the above-described first differential mechanism is provided with a first rotary element connected to the above-described first electric motor, a second rotary element connected to the above-described engine, and a third rotary element connected to the above-described output rotary member, while the above-described second differential mechanism is provided with a first rotary element connected to the above-described second electric motor, a second rotary element, and a third rotary element, one of the second and third rotary elements being connected to the third rotary element of the above-described first differential mechanism, and the above-described clutch is configured to selectively connect the second rotary element of the above-described first differential mechanism, and the other of the second and third rotary elements of the above-described second differential mechanism which is not connected to the third rotary element of the above-described first differential mechanism, to each other, while the above-described brake is configured to selectively fix the other of the second and third rotary elements of the above-described second differential mechanism which is not connected to the third rotary element of the above-described first differential mechanism, to the stationary member. According to this fifth aspect of the invention, it is possible to reduce the length of time required for charging the vehicle driving battery in a drive system of the hybrid vehicle, which has a highly practical arrangement.

MODE FOR CARRYING OUT THE INVENTION

Figure 1:
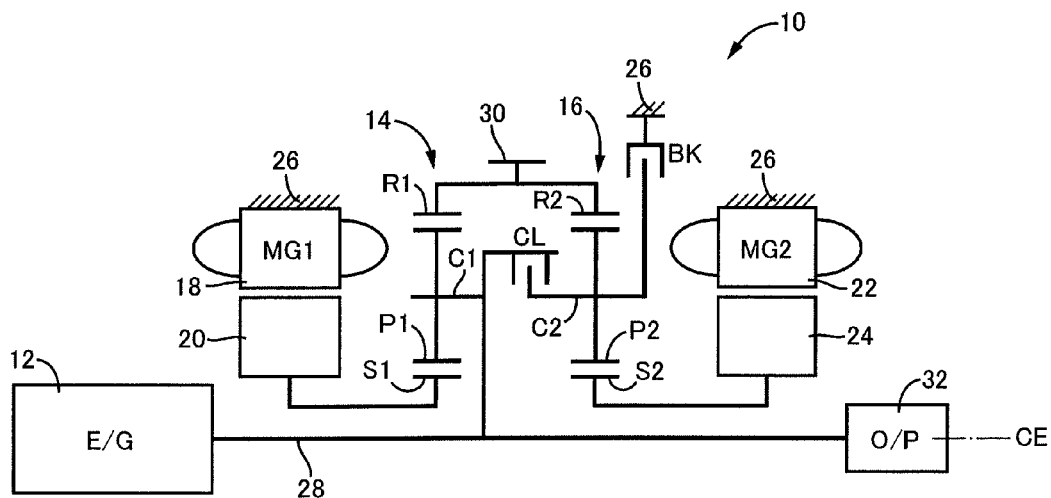
FIG. 1 is a schematic view for explaining an arrangement of a hybrid vehicle drive system to which the present invention is suitably applicable.

According to the present invention, the first and second differential mechanisms as a whole have four rotary elements while the above-described clutch is placed in the engaged state. In one preferred form of the present invention, the first and second differential mechanisms as a whole have four rotary elements while a plurality of clutches, each of which is provided between the rotary elements of the first and second differential mechanisms and which includes the above-described clutch, are placed in their engaged states. In other words, the present invention is suitably applicable to a drive control device for a hybrid vehicle which is provided with the first and second differential mechanisms represented as the four rotary elements indicated in a collinear chart, the engine, the first electric motor, the second electric motor and the output rotary member coupled to the respective four rotary elements, and wherein one of the four rotary elements is selectively connected through the above-described clutch to another of the rotary elements of the first differential mechanism and another of the rotary elements of the second differential mechanism, while the rotary element of the first or second differential mechanism to be selectively connected to the above-indicated one rotary element through the clutch is selectively fixed through the above-described brake to the stationary member.

In another preferred form of the present invention, the above-described clutch and brake are hydraulically operated coupling devices operating states (engaged and released states) of which are controlled according to a hydraulic pressure. While wet multiple-disc type frictional coupling devices are preferably used as the clutch and brake, meshing type coupling devices, namely, so-called dog clutches (claw clutches) may also be used. Alternatively, the clutch and brake may be electromagnetic clutches, magnetic powder clutches and any other clutches the operating states of which are controlled (which are engaged and released) according to electric commands.

The drive system to which the present invention is applicable is placed in a selected one of a plurality of drive modes, depending upon the operating states of the above-described clutch and brake. Preferably, EV drive modes in which at least one of the above-described first and second electric motors is used as a vehicle drive power source with the engine stopped include a mode 1 to be established in the engaged state of the brake and in the released state of the clutch, and a mode 2 to be established in the engaged states of both of the clutch and brake. Further, hybrid drive modes in which the above-described engine is operated while the above-described first and second electric motors are operated to generate a vehicle drive force and/or an electric energy as needed, include a mode 3 to be established in the engaged state of the brake and in the released state of the clutch, a mode 4 to be established in the released state of the brake and the engaged state of the clutch, and a mode 5 to be established in the released states of both of the brake and clutch.

In a further preferred form of the invention, the rotary elements of the above-described first differential mechanism, and the rotary elements of the above-described second differential mechanism are arranged as seen in the collinear charts, in the engaged state of the above-described clutch and in the released state of the above-described brake, in the order of the first rotary element of the first differential mechanism, the first rotary element of the second differential mechanism, the second rotary element of the first differential mechanism, the second rotary element of the second differential mechanism, the third rotary element of the first differential mechanism, and the third rotary element of the second differential mechanism, where the rotating speeds of the second rotary elements and the third rotary elements of the first and second differential mechanisms are indicated in mutually overlapping states in the collinear charts.

Referring to the drawings, preferred embodiments of the present invention will be described in detail. It is to be understood that the drawings referred to below do not necessarily accurately represent ratios of dimensions of various elements.

First Embodiment

FIG. 1 is the schematic view for explaining an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common center axis CE. The drive system 10 is constructed substantially symmetrically with respect to the center axis CE. In FIG. 1, a lower half of the drive system 10 is not shown. This description applies to other embodiments which will be described.

The engine 12 is an internal combustion engine such as a gasoline engine, which is operable to generate a drive force by combustion of a fuel such as a gasoline injected into its cylinders. Each of the first electric motor MG1 and second electric motor MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio $\rho 1$ and which is provided with rotary elements (elements) consisting of: a first rotary element in the form of a sun gear S1; a second rotary element in the form of a carrier C1 supporting a pinion gear P1 such that the pinion gear P1 is rotatable about its axis and the axis of the planetary gear set; and a third rotary element in the form of a ring gear R1 meshing with the sun gear S1 through the pinion gear P1. The second planetary gear set 16 is a single-pinion type planetary gear set which has a gear ratio $\rho 2$ and which is provided with rotary elements (elements) consisting of: a first rotary element in the form of a sun gear S2; a second rotary element in the form of a carrier C2 supporting a pinion gear P2 such that the pinion gear P2 is rotatable about its axis and the axis of the planetary gear set; and a third rotary element in the form of a ring gear R2 meshing with the sun gear S2 through the pinion gear P2.

The sun gear S1 of the first planetary gear set 14 is connected to the rotor 20 of the first electric motor MG1. The carrier C1 of the first planetary gear set 14 is connected to an input shaft 28 which is rotated integrally with a crankshaft of the engine 12. This input shaft 28 is rotated about the center axis CE. In the following description, the direction of extension of this center axis CE will be referred to as an "axial direction", unless otherwise specified. The ring gear R1 of the first planetary gear set 14 is connected to an output rotary member in the form of an output gear 30, and to the ring gear R2 of the second planetary gear set 16. The sun gear S2 of the second planetary gear set 16 is connected to the rotor 24 of the second electric motor MG2.

The drive force received by the output gear 30 is transmitted to a pair of left and right drive wheels (not shown) through a differential gear device not shown and axles not shown. On the other hand, a torque received by the drive wheels from a roadway surface on which the vehicle is running is transmitted (input) to the output gear 30 through the differential gear device and axles, and to the drive system 10. A mechanical oil pump 32, which is a vane pump, for instance, is connected to one of opposite end portions of the input shaft 28, which one end portion is remote from the engine 12. The oil pump 32 is operated by the engine 12, to generate a hydraulic pressure to be applied to a hydraulic control unit 60, etc. which will be described. An electrically operated oil pump which is operated with an electric energy may be provided in addition to the oil pump 32.

Between the carrier C1 of the first planetary gear set 14 and the carrier C2 of the second planetary gear set 16, there is disposed a clutch CL which is configured to selectively couple these carriers C1 and C2 to each other (to selectively connect the carriers C1 and C2 to each other or disconnect the carriers C1 and C2 from each other). Between the carrier C2 of the second planetary gear set 16 and the stationary member in the form of the housing 26, there is disposed a brake BK which is configured to selectively couple (fix) the carrier C2 to the housing 26. Each of these clutch CL and brake BK is a hydraulically operated coupling device the operating state of which is controlled (which is engaged and released) according to the hydraulic pressure applied thereto from the hydraulic control unit 60. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from an electronic control device 40.

As shown in FIG. 1, the drive system 10 is configured such that the first planetary gear set 14 and second planetary gear set 16 are disposed coaxially with the input shaft 28 (disposed on the center axis CE), and opposed to each other in the axial direction of the center axis CE. Namely, the first planetary gear set 14 is disposed on one side of the second planetary gear set 16 on a side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16 which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16 are interposed between the first electric motor MG1 and second electric motor MG2. That is, the drive system 10 is configured such that the first electric motor MG1, first planetary gear set 14, clutch CL, second planetary gear set 16, brake BK and second electric motor MG2 are disposed coaxially with each other, in the order of description from the side of the engine 12, in the axial direction of the center axis CE.

Figure 2:
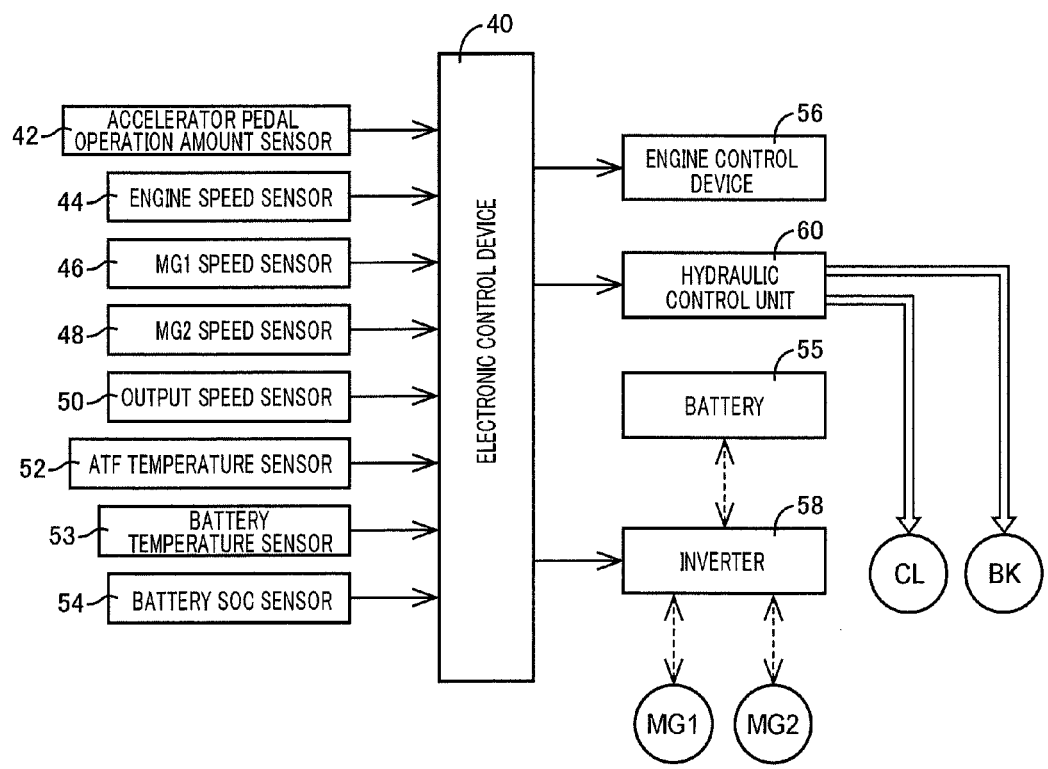
FIG. 2 is a view for explaining major portions of a control system provided to control the drive system of FIG. 1.

FIG. 2 is the view for explaining major portions of a control system provided to control the drive system 10. The electronic control device 40 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first electric motor MG1 and second electric motor MG2. In the present embodiment, the electronic control device 40 corresponds to a drive control device for a hybrid vehicle having the drive system 10. The electronic control device 40 may be constituted by mutually independent control units as needed for respective controls such as an output control of the engine 12 and drive controls of the first electric motor MG1 and second electric motor MG2.

As indicated in FIG. 2, the electronic control device 40 is configured to receive various signals from sensors and switches provided in the drive system 10. Namely, the electronic control device 40 receives: an output signal of an accelerator pedal operation amount sensor 42 indicative of an operation amount or angle $A_{CC}$ of an accelerator pedal (not shown), which corresponds to a vehicle output required by a vehicle operator; an output signal of an engine speed sensor 44 indicative of an engine speed $N_E$, that is, an operating speed of the engine 12; an output signal of an MG1 speed sensor 46 indicative of an operating speed $N_{MG1}$ of the first electric motor MG1; an output signal of an MG2 speed sensor 48 indicative of an operating speed $N_{MG2}$ of the second electric motor MG2; an output signal of an output speed sensor 50 indicative of a rotating speed $N_{OUT}$ of the output gear 30, which corresponds to a running speed V of the vehicle; an output signal of an ATF temperature sensor 52 indicative of an ATF temperature $Th_{ATF}$ which is a temperature of a working fluid (e.g., working oil) to be supplied to various parts of the drive system 10; an output signal of a battery temperature sensor 53 indicative of a temperature $Th_{bat}$ of a battery 55; and an output signal of a battery SOC sensor 54 indicative of a stored electric energy amount (state of charge) SOC of the battery 55.

The electronic control device 40 is also configured to generate various control commands to be applied to various portions of the drive system 10. Namely, the electronic control device 40 applies to an engine control device 56 for controlling an output of the engine 12, following engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 40 applies command signals to an inverter 58, for controlling operations of the first electric motor MG1 and second electric motor MG2, so that the first and second electric motors MG1 and MG2 are operated with electric energies supplied thereto from the battery 55 through the inverter 58 according to the command signals to control outputs (output torques) of the electric motors MG1 and MG2. Electric energies generated by the first and second electric motors MG1 and MG2 are supplied to and stored in the battery 55 through the inverter 58. That is, the battery 55 corresponds to a vehicle driving battery in the drive system 10. Further, the electronic control device 40 applies command signals for controlling the operating states of the clutch CL and brake BK, to linear solenoid valves and other electromagnetic control valves provided in the hydraulic control unit 60, so that hydraulic pressures generated by those electromagnetic control valves are controlled to control the operating states of the clutch CL and brake BK.

An operating state of the drive system 10 is controlled through the first electric motor MG1 and second electric motor MG2, such that the drive system 10 functions as an electrically controlled differential portion whose difference of input and output speeds is controllable. For example, an electric energy generated by the first electric motor MG1 is supplied to the battery or the second electric motor MG2 through the inverter 58. Namely, a major portion of the drive force of the engine 12 is mechanically transmitted to the output gear 30, while the remaining portion of the drive force is consumed by the first electric motor MG1 operating as the electric generator, and converted into the electric energy, which is supplied to the second electric motor MG2 through the inverter 58, so that the second electric motor MG2 is operated to generate a drive force to be transmitted to the output gear 30. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
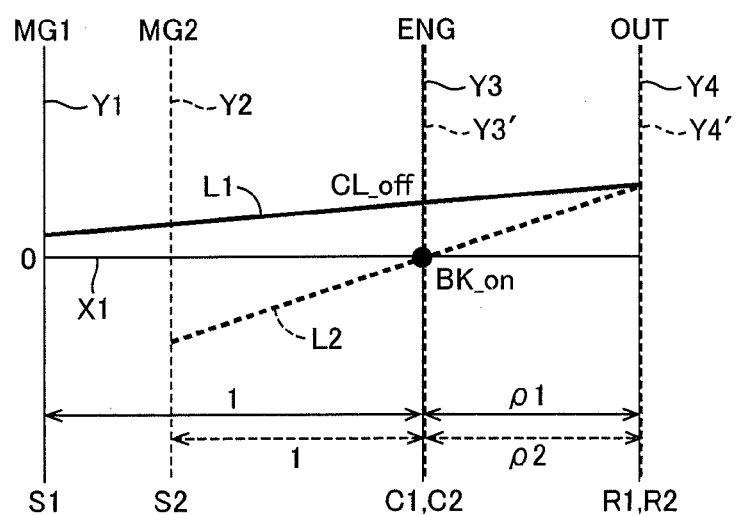
FIG. 3 is a table indicating combinations of operating states of a clutch and a brake, which correspond to respective five drive modes of the drive system of FIG. 1.
FIG. 4 is a collinear chart having straight lines which permit indication thereon of relative rotating speeds of various rotary elements of the drive system of FIG. 1, the collinear chart corresponding to the modes 1 and 3 of FIG. 3.

In the hybrid vehicle provided with the drive system 10 constructed as described above, one of a plurality of drive modes is selectively established according to the operating states of the engine 12, first electric motor MG1 and second electric motor MG2, and the operating states of the clutch CL and brake BK. FIG. 3 is the table indicating combinations of the operating states of the clutch CL and brake BK, which correspond to the respective five drive modes of the drive system 10. In this table, "o" marks represent an engaged state while blanks represent a released state. The drive modes EV-1 and EV-2 indicated in FIG. 3 are EV drive modes in which the engine 12 is held at rest while at least one of the first electric motor MG1 and second electric motor MG2 is used as a vehicle drive power source. The drive modes HV-1, HV-2 and HV-3 are hybrid drive modes (HV modes) in which the engine 12 is operated as the vehicle drive power source while the first electric motor MG1 and second electric motor MG2 are operated as needed to generate a vehicle drive force and/or an electric energy. In these hybrid drive modes, at least one of the first electric motor MG1 and second electric motor MG2 is operated to generate a reaction force or placed in a non-load free state.

As is apparent from FIG. 3, the EV drive modes of the drive system 10 in which the engine 12 is held at rest while at least one of the first electric motor MG1 and second electric motor MG2 is used as the vehicle drive power source consist of: a mode 1 (drive mode 1) in the form of the drive mode EV-1 which is established in the engaged state of the brake BK and in the released state of the clutch CL; and a mode 2 (drive mode 2) in the form of the drive mode EV-2 which is established in the engaged states of both of the brake BK and clutch CL. The hybrid drive modes in which the engine 12 is operated as the vehicle drive power source while the first electric motor MG1 and second electric motor MG2 are operated as needed to generate a vehicle drive force and/or an electric energy, consist of: a mode 3 (drive mode 3) in the form of the drive mode HV-1 which is established in the engaged state of the brake BK and in the released state of the clutch CL; a mode 4 (drive mode 4) in the form of the drive mode HV-2 which is established in the released state of the brake BK and in the engaged state of the clutch CL; and a mode 5 (drive mode 5) in the form of the drive mode HV-3 which is established in the released states of both of the brake BK and clutch CL.

FIGS. 4-7 are the collinear charts having straight lines which permit indication thereon of relative rotating speeds of the various rotary elements of the drive system 10 (first planetary gear set 14 and second planetary gear set 16), which rotary elements are connected to each other in different manners corresponding to respective combinations of the operating states of the clutch CL and brake BK. These collinear charts are defined in a two-dimensional coordinate system having a horizontal axis along which relative gear ratios $\rho$ of the first and second planetary gear sets 14 and 16 are taken, and a vertical axis along which the relative rotating speeds are taken. The collinear charts indicate the relative rotating speeds when the output gear 30 is rotated in the positive direction to drive the hybrid vehicle in the forward direction. A horizontal line X1 represents the rotating speed of zero, while vertical lines Y1 through Y4 arranged in the order of description in the rightward direction represent the respective relative rotating speeds of the sun gear S1, sun gear S2, carrier C1 and ring gear R1. Namely, a solid line Y1 represents the relative rotating speed of the sun gear S1 of the first planetary gear set 14 (operating speed of the first electric motor MG1), a broken line Y2 represents the relative rotating speed of the sun gear S2 of the second planetary gear set 16 (operating speed of the second electric motor MG2), a solid line Y3 represents the relative rotating speed of the carrier C1 of the first planetary gear set 14 (operating speed of the engine 12), a broken line Y3' represents the relative rotating speed of the carrier C2 of the second planetary gear set 16, a solid line Y4 represents the relative rotating speed of the ring gear R1 of the first planetary gear set 14 (rotating speed of the output gear 30), and a broken line Y4' represents the relative rotating speed of the ring gear R2 of the second planetary gear set 16. In FIGS. 4-7, the vertical lines Y3 and Y3' are superimposed on each other, while the vertical lines Y4 and Y4' are superimposed on each other. Since the ring gears R1 and R2 are fixed to each other, the relative rotating speeds of the ring gears R1 and R2 represented by the vertical lines Y4 and Y4' are equal to each other.

In FIGS. 4-7, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2-Y4') are determined by the gear ratios $\rho1$ and $\rho2$ of the first and second planetary gear sets 14 and 16. Described more specifically, regarding the vertical lines Y1, Y3 and Y4 corresponding to the respective three rotary elements in the form of the sun gear S1, carrier C1 and ring gear R1 of the first planetary gear set 14, a distance between the vertical lines Y1 and Y3 corresponds to "1", while a distance between the vertical lines Y3 and Y4 corresponds to the gear ratio "$\rho1$". Regarding the vertical lines Y2, Y3' and Y4' corresponding to the respective three rotary elements in the form of the sun gear S2, carrier C2 and ring gear R2 of the second planetary gear set 16, a distance between the vertical lines Y2 and Y3' corresponds to "1", while a distance between the vertical lines Y3' and Y4' corresponds to the gear ratio "$\rho2$". In the drive system 10, the gear ratio $\rho2$ of the second planetary gear set 16 is higher than the gear ratio $\rho1$ of the first planetary gear set 14 ($\rho2>\rho1$). The drive modes of the drive system 10 will be described by reference to FIGS. 4-7.

The drive mode EV-1 indicated in FIG. 3 corresponds to the mode 1 (drive mode 1) of the drive system 10, which is preferably the EV drive mode in which the engine 12 is held at rest while the second electric motor MG2 is used as the vehicle drive power source. FIG. 4 is the collinear chart corresponding to the mode 1. Described by reference to this collinear chart, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 1, the rotating direction of the sun gear S2 and the rotating direction of the ring gear R2 in the second planetary gear set 16 are opposite to each other, so that when the second electric motor MG2 is operated to generate a negative torque (acting in the negative direction), the ring gear R2, that is, the output gear 30 is rotated in the positive direction by the generated negative torque. Namely, the hybrid vehicle provided with the drive system 10 is driven in the forward direction when the negative torque is generated by the second electric motor MG2. In this case, the first electric motor MG1 is preferably held in a free state. In this mode 1, the carriers C1 and C2 are permitted to be rotated relative to each other, so that the hybrid vehicle can be driven in the EV drive mode similar to an EV drive mode which is established in a vehicle provided with a so-called "THS" (Toyota Hybrid System) and in which the carrier C2 is fixed to the stationary member.

Figure 5:
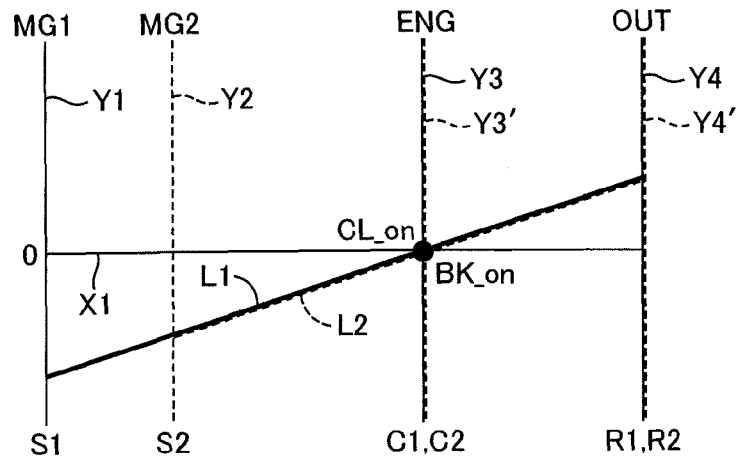
FIG. 5 is a collinear chart having straight lines which permit indication thereon of relative rotating speeds of various rotary elements of the drive system of FIG. 1, the collinear chart corresponding to the mode 2 of FIG. 3.

The drive mode EV-2 indicated in FIG. 3 corresponds to the mode 2 (drive mode 2) of the drive system 10, which is preferably the EV drive mode in which the engine 12 is held at rest while at least one of the first electric motor MG1 and second electric motor MG2 is used as the vehicle drive power source. FIG. 5 is the collinear chart corresponding to the mode 2. Described by reference to this collinear chart, the carrier C1 of the first planetary gear set 14 and the carrier C2 of the second planetary gear set 16 are not rotatable relative to each other in the engaged state of the clutch CL. Further, in the engaged state of the brake BK, the carrier C2 of the second planetary gear set 16 and the carrier C1 of the first planetary gear set 14 which is connected to the carrier C2 are coupled (fixed) to the stationary member in the form of the housing 26, so that the rotating speeds of the carriers C1 and C2 are held zero. In this mode 2, the rotating direction of the sun gear S1 and the rotating direction of the ring gear R1 in the first planetary gear set 14 are opposite to each other, and the rotating direction of the sun gear S2 and the rotating direction of the ring gear R2 in the second planetary gear set 16 are opposite to each other, so that when the first electric motor MG1 and/or second electric motor MG2 is/are operated to generate a negative torque (acting in the negative direction), the ring gears R1 and R2 are rotated, that is, the output gear 30 is rotated in the positive direction by the generated negative torque. Namely, the hybrid vehicle provided with the drive system 10 is driven in the forward direction when the negative torque is generated by at least one of the first electric motor MG1 and second electric motor MG2.

In the mode 2, at least one of the first electric motor MG1 and second electric motor MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery 55. Namely, the mode 2 is an EV drive mode in which amounts of work to be assigned to the first and second electric motors MG1 and MG2 can be adjusted with respect to each other, and which may be established under various running conditions of the hybrid vehicle, or may be kept for a relatively long length of time. Accordingly, the mode 2 is advantageously provided on a hybrid vehicle such as a plug-in hybrid vehicle, which is frequently placed in an EV drive mode.

The drive mode HV-1 indicated in FIG. 3 corresponds to the mode 3 (drive mode 3) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 4 is the collinear chart corresponding to the mode 3. Described by reference to this collinear chart, the carrier C1 of the first planetary gear set 14 and the carrier C2 of the second planetary gear set 16 are rotatable relative to each other, in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 3, the engine 12 is operated to generate an output torque by which the output gear 30 is rotated. At this time, the first electric motor MG1 is operated to generate a reaction torque in the first planetary gear set 14, so that the output of the engine 12 can be transmitted to the output gear 30. In the second planetary gear set 16, the rotating direction of the sun gear S2 and the rotating direction of the ring gear R2 are opposite to each other, in the engaged state of the brake BK, so that when the second electric motor MG2 is operated to generate a negative torque (acting in the negative direction), the ring gears R1 and R2 are rotated, that is, the output gear 30 is rotated in the positive direction by the generated negative torque.

Figure 6:
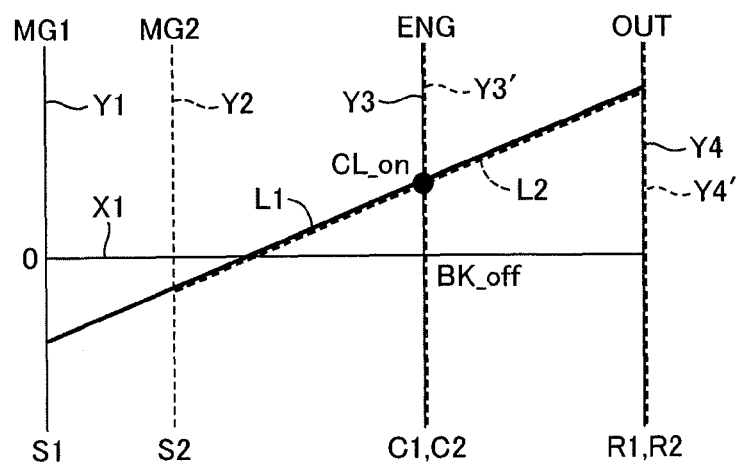
FIG. 6 is a collinear chart having straight lines which permit indication thereon of relative rotating speeds of various rotary elements of the drive system of FIG. 1, the collinear chart corresponding to the mode 4 of FIG. 3.

The drive mode HV-2 indicated in FIG. 3 corresponds to the mode 4 (drive mode 4) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 6 is the collinear chart corresponding to the mode 4. Described by reference to this collinear chart, the carrier C1 of the first planetary gear set 14 and the carrier C2 of the second planetary gear set 16 are not rotatable relative to each other, in the engaged state of the clutch CL, that is, the carriers C1 and C2 are integrally rotated as a single rotary element. The ring gears R1 and R2, which are fixed to each other, are integrally rotated as a single rotary element. Namely, in the mode 4 of the drive system 10, the first planetary gear set 14 and second planetary gear set 16 function as a differential mechanism having a total of four rotary elements. That is, the drive mode 4 is a composite split mode in which the four rotary elements consisting of the sun gear S1 (connected to the first electric motor MG1), the sun gear S2 (connected to the second electric motor MG2), the rotary element constituted by the carriers C1 and C2 connected to each other (and to the engine 12), and the rotary element constituted by the ring gears R1 and R2 fixed to each other (and connected to the output gear 30) are connected to each other in the order of description in the rightward direction as seen in FIG. 6.

In the mode 4, the rotary elements of the first planetary gear set 14 and second planetary gear set 16 are preferably arranged as indicated in the collinear chart of FIG. 6, that is, in the order of the sun gear S1 represented by the vertical line Y1, the sun gear S2 represented by the vertical line Y2, the carriers C1 and C2 represented by the vertical line Y3 (Y3'), and the ring gears R1 and R2 represented by the vertical line Y4 (Y4'). The gear ratios ρ1 and ρ2 of the first and second planetary gear sets 14 and 16 are determined such that the vertical line Y1 corresponding to the sun gear S1 and the vertical line Y2 corresponding to the sun gear S2 are positioned as indicated in the collinear chart of FIG. 6, namely, such that the distance between the vertical lines Y1 and Y3 is longer than the distance between the vertical lines Y2 and Y3'. In other words, the distance between the vertical lines corresponding to the sun gear S1 and the carrier C1 and the distance between the vertical lines corresponding to the sun gear S2 and the carrier C2 correspond to "1", while the distance between the vertical lines corresponding to the carrier C1 and the ring gear R1 and the distance between the vertical lines corresponding to the carrier C2 and the ring gear R2 correspond to the respective gear ratios ρ1 and ρ2. Accordingly, the drive system 10 is configured such that the gear ratio ρ2 of the second planetary gear set 16 is higher than the gear ratio ρ1 of the first planetary gear set 14.

In the mode 4, the carrier C1 of the first planetary gear set 14 and the carrier C2 of the second planetary gear set 16 are connected to each other in the engaged state of the clutch CL, so that the carriers C1 and C2 are rotated integrally with each other. Accordingly, either one or both of the first electric motor MG1 and second electric motor MG2 can receive a reaction force corresponding to the output of the engine 12. Namely, one or both of the first and second electric motors MG1 and MG2 can be operated to receive the reaction force during an operation of the engine 12, and each of the first and second electric motors MG1 and MG2 can be operated at an operating point assuring a relatively high degree of operating efficiency, and/or with a reduced degree of torque limitation due to heat generation. For example, one of the first and second electric motors MG1 and MG2 which is operable with a high degree of operating efficiency is preferentially operated to generate a reaction force, so that the overall operating efficiency can be improved. Further, where there is a torque limitation of one of the first electric motor MG1 and second electric motor MG2 due to heat generation, it is possible to ensure the generation of the reaction force required for the engine 12, by controlling the other electric motor so as to perform a regenerative operation or a vehicle driving operation, for providing an assisting vehicle driving force.

Figure 7:
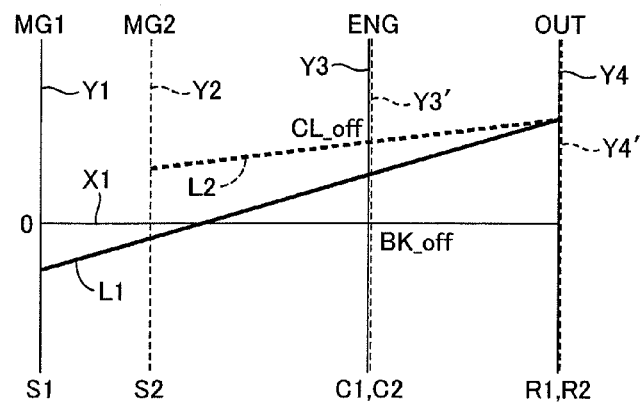
FIG. 7 is a collinear chart having straight lines which permit indication thereon of relative rotating speeds of various rotary elements of the drive system of FIG. 1, the collinear chart corresponding to the mode 5 of FIG. 3.

The drive mode HV-3 indicated in FIG. 3 corresponds to the mode 5 (drive mode 5) of the drive system 10, which is preferably the hybrid drive mode in which the engine 12 is operated as the vehicle drive power source while the first electric motor MG1 is operated as needed to generate a vehicle drive force and/or an electric energy. In this mode 5, the engine 12 and first electric motor MG1 may be operated to generate a vehicle drive force, with the second electric motor MG2 being disconnected from a drive system. FIG. 7 is the collinear chart corresponding to this mode 5. Described by reference to this collinear chart, the carrier C1 of the first planetary gear set 14 and the carrier C2 of the second planetary gear set 16 are rotatable relative to each other in the released state of the clutch CL. In the released state of the brake BK, the carrier C2 of the second planetary gear set 16 is rotatable relative to the stationary member in the form of the housing 26. In this arrangement, the second electric motor MG2 can be held at rest while it is disconnected from the drive system (power transmitting path).

In the mode 3 in which the brake BK is placed in the engaged state, the second electric motor MG2 is kept in an operated state together with a rotary motion of the output gear 30 (ring gear R2) during running of the vehicle. In this operating state, the operating speed of the second electric motor MG2 may reach an upper limit value (upper limit) during running of the vehicle at a comparatively high speed, or a rotary motion of the ring gear R2 at a high speed is transmitted to the sun gear S2. In this respect, it is not necessarily desirable to keep the second electric motor MG2 in the operated state during running of the vehicle at a comparatively high speed, from the standpoint of the operating efficiency. In the mode 5, on the other hand, the engine 12 and the first electric motor MG1 may be operated to generate the vehicle drive force during running of the vehicle at the comparatively high speed, while the second electric motor MG2 is disconnected from the drive system, so that it is possible to reduce a power loss due to dragging of the unnecessarily operated second electric motor MG2, and to eliminate a limitation of the highest vehicle running speed corresponding to the permissible highest operating speed (upper limit of the operating speed) of the second electric motor MG2.

It will be understood from the foregoing description, the drive system 10 is selectively placed in one of the three hybrid drive modes in which the engine 12 is operated as the vehicle drive power source, namely, in one of the drive mode HV-1 (mode 3), drive mode HV-2 (mode 4) and drive mode HV-3 (mode 5), which are selectively established by respective combinations of the engaged and released states of the clutch CL and brake BK. Accordingly, the transmission efficiency can be improved to improve the fuel economy of the vehicle, by selectively establishing one of the three hybrid drive modes according to the vehicle running speed and the speed ratio, in which the transmission efficiency is the highest.

Figure 8:
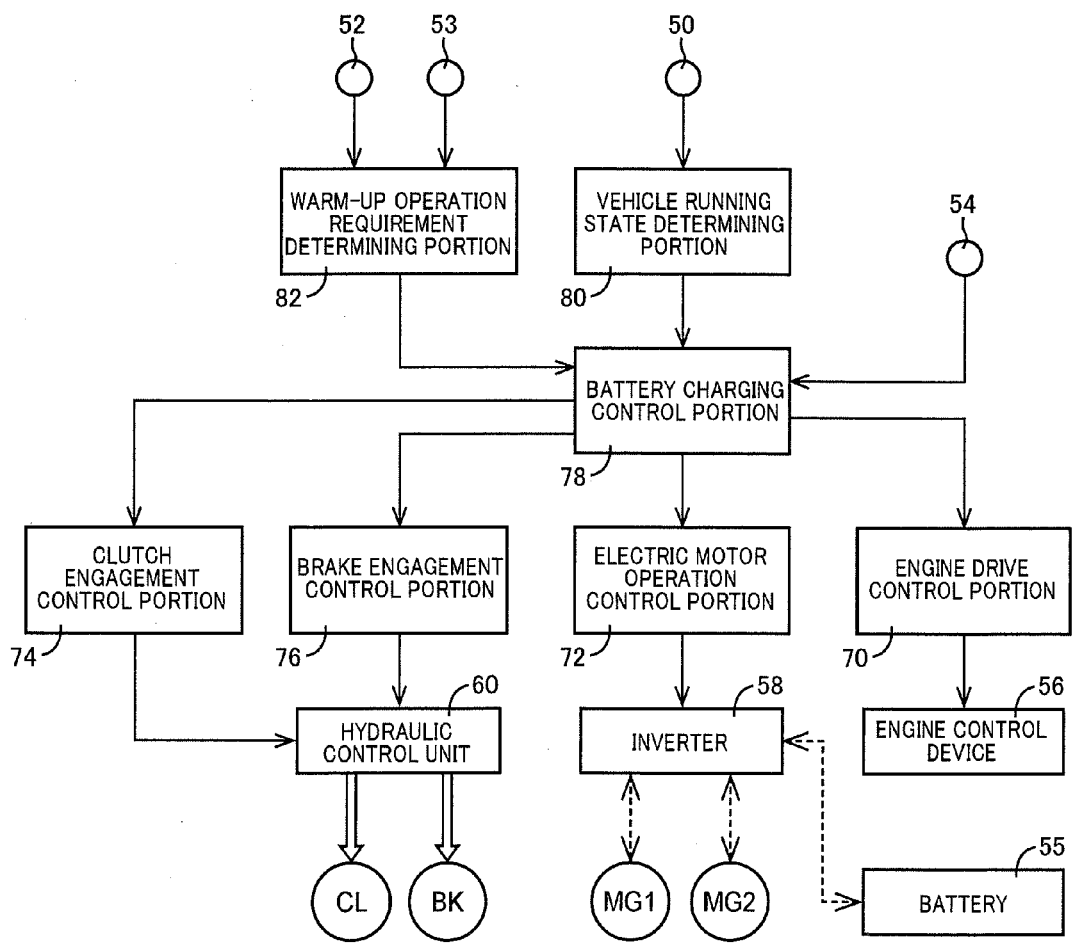
FIG. 8 is a functional block diagram for explaining major control functions of an electronic control device of FIG. 2.

FIG. 8 is the functional block diagram for explaining major control functions of the electronic control device 40. An engine drive control portion 70 shown in FIG. 8 is configured to control an operation of the engine 12 through the engine control device 56. For instance, the engine drive control portion 70 commands the engine control device 56 to control an amount of supply of a fuel by a fuel injecting device of the engine 12 into an intake pipe, for example, a timing of ignition (ignition timing) of the engine 12 by an igniting device, and an opening angle $\theta_{TH}$ of an electronic throttle valve, so that the engine 12 generates a required output, that is, a target torque (target engine output). In the hybrid drive modes in which the engine 12 is operated while the first and second electric motors MG1 and MG2 are used as the vehicle drive power source, a required vehicle drive force to be generated by the drive system 10 (output gear 30) is calculated on the basis of the accelerator pedal operation amount $A_{CC}$ detected by the accelerator pedal operation amount sensor 42, and the vehicle running speed V corresponding to the output speed $N_{OUT}$ detected by the output speed sensor 50, for example. The operations of the first and second electric motors MG1 and MG2 are controlled by an electric motor operation control portion 72 described below, while the operation of the engine 12 is controlled by the engine drive control portion 70, so that the calculated required vehicle drive force is obtained by the output torque of the engine 12 and the output torques of the first and second electric motors MG1 and MG2.

The electric motor operation control portion 72 is configured to control the operations of the first and second electric motors MG1 and MG2 through the inverter 58. Described more specifically, the electric motor operation control portion 72 controls the amounts of electric energy to be supplied from the battery 55 to the first and second electric motors MG1 and MG2 through the inverter 58, so that each of the first and second electric motors MG1 and MG2 provides a required output, that is, a target torque (target electric motor output). When the first or second electric motor MG1, MG2 is operated as an electric generator, the electric motor operation control portion 72 implements a control for storing an electric energy generated by the first or second electric motor MG1, MG2, in the battery 55 through the inverter 58.

A clutch engagement control portion 74 is configured to control the operating state of the clutch CL through the hydraulic control unit 60. For instance, the clutch engagement control portion 74 controls an output hydraulic pressure of a solenoid control valve provided in the hydraulic control unit 60 to control the clutch CL, so as to place the clutch CL in an engaged state or a released state. A brake engagement control portion 76 is configured to control the operating state of the brake BK through the hydraulic control unit 60. For instance, the brake engagement control portion 76 controls an output hydraulic pressure of a solenoid control valve provided in the hydraulic control unit 60 to control the brake BK, so as to place the brake BK in an engaged state or a released state. The clutch engagement control portion 74 and the brake engagement control portion 76 are basically configured to control the operating states of the clutch CL and the brake BK to establish the drive mode selected according to a running state of the hybrid vehicle. Namely, the clutch and brake engagement control portions 74 and 76 establish one of the combinations of the operating states of the clutch CL and the brake BK indicated in FIG. 3, which corresponds to one of the modes 1-5 to be established.

A battery charging control portion 78 is configured to implement a control for charging the vehicle driving battery in the form of the battery 55. For example, the battery charging control portion 78 implements an electricity generating control (charging control) by commanding the engine 12 to generate a drive force for operating at least one of the first and second electric motors MG1 and MG2 to generate an electric energy so that the generated electric energy is stored in the battery 55, when the stored electric energy amount SOC detected by the battery SOC sensor 54 is reduced below a predetermined threshold value. Described more specifically, the battery charging control portion 78 applies a charging command to the electric motor operation control portion 72 to control the operation of at least one of the first and second electric motors MG1 and MG2 to generate the electric energy.

A vehicle running state determining portion 80 is configured to determine a running state of the hybrid vehicle provided with the drive system 10. Preferably the vehicle running state determining portion 80 determines whether the hybrid vehicle is in a stationary state (held stationary). For instance, the vehicle running state determining portion 80 determines whether the vehicle running speed V corresponding to the output speed $N_{OUT}$ detected by the output speed sensor 50 is zero, and determines that the hybrid vehicle is in the stationary state, if the vehicle running speed V is zero. The vehicle running state determining portion 80 is preferably configured to determine whether the hybrid vehicle is in a decelerating state (in a decelerating run). For example, the vehicle running state determining portion 80 determines that the hybrid vehicle is in the decelerating state, if a change rate dV/dt (acceleration value) of the vehicle running speed V corresponding to the output speed $N_{OUT}$ detected by the output speed sensor 50 is a negative value. The vehicle running state determining portion 80 is preferably configured to determine whether the hybrid vehicle is running. For instance, the vehicle running state determining portion 80 determines that the hybrid vehicle is running, if the vehicle running speed V corresponding to the output speed $N_{OUT}$ detected by the output speed sensor 50 is higher than a predetermined threshold value $V_{bo}$ (e.g., zero).

A warm-up operation requirement determining portion 82 is configured to determine whether a warm-up operation of the hybrid vehicle with the drive system 10 is required. The warm-up operation requirement determining portion 82 is preferably configured to determine that the warm-up operation is required, if the ATF temperature $Th_{ATF}$ detected by the ATF temperature sensor 52 is lower than a predetermined threshold value $Th_{ATF\_bo}$. The warm-up operation requirement determining portion 82 is preferably configured to determine that the warm-up operation is required, if the battery temperature $Th_{bat}$ detected by the battery temperature sensor 53 is lower than a predetermined threshold value $Th_{bat\_bo}$. The warm-up operation of the drive system 10 is performed by operating the engine 12, operating the first or second electric motor MG1 or MG2, and charging or discharging the battery 55.

When at least one of the first and second electric motors MG1 and MG2 is operated to generate an electric energy, the battery charging control portion 78 commands the clutch engagement control portion 74 and the brake engagement control portion 76 to control the operating states of the clutch CL and the brake BK. Described more specifically, the battery charging control portion 78 commands the clutch engagement control portion 74 to engage the clutch CL. Preferably, the battery charging control portion 78 commands the clutch engagement control portion 74 to engage the clutch CL and commands the brake engagement control portion 76 to release the brake BK. With the operating states of the clutch CL and the brake BK being thus controlled, the drive system 10 is placed in the mode 4 (HV-2) indicated in FIG. 3.

Figure 9:
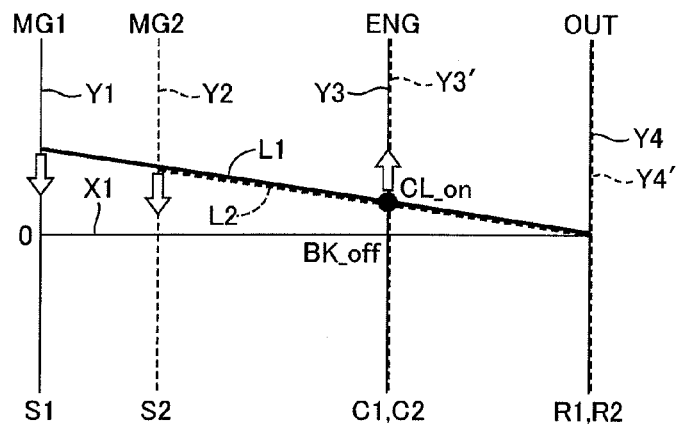
FIG. 9 is a collinear chart having straight lines which permit indication thereon of relative rotating speeds of various rotary elements of the drive system of FIG. 1 when the electric motors are operated to generate an electric energy.

FIG. 9 is a collinear chart having straight lines which permit indication thereon of relative rotating speeds of the various rotary elements when at least one of the first and second electric motors MG1 and MG2 is operated to generate an electric energy, in the engaged state of the clutch CL and in the released state of the brake BK when the hybrid vehicle is in a stationary state. In FIG. 9, torques of the rotary elements are indicated by white arrows. As indicated in FIG. 9, the rotating speed of the output rotary member in the form of the output gear 30 taken along the vehicle line Y4 (Y4') is zero (the output gear 30 is stationary) in the stationary state of the hybrid vehicle, so that the first and second electric motors MG1 and MG2 can be operated by the engine 12 to generate an electric energy. Since the clutch CL is placed in the engaged state while the brake BK is placed in the released state, an output of the engine 12 can be absorbed (used to generate the electric energy) by both of the first and second electric motors MG1 and MG2, so that the first and second electric motors MG1 and MG2 can cooperate with each other to perform an electricity generating operation. Accordingly, an operating region in which the engine 12 can be operated is enlarged, so that the fuel economy can be improved, and the length of time required for charging the battery 55 can be made shorter than where only one of the first and second electric motors MG1 and MG2 is operated to generate the electric energy. Further, since the battery charging operation is assigned to both of the first and second electric motors MG1 and MG2, a load acting on the first planetary gear set 14 can be made lower than where only the first electric motor MG1 is operated to perform the battery charging operation. Accordingly, a level of a gear noise to be generated in the first planetary gear set 14 can be advantageously reduced where the electricity generating operation must be performed at an operating point of the first planetary gear set 14 at which the gear noise is likely to be generated.

When at least one of the first and second electric motors MG1 and MG2 performs the electricity generating operation while the hybrid vehicle is in the stationary or decelerating state, the battery charging control portion 78 preferably commands the clutch CL to be placed in the engaged state, commands the brake BK to be placed in the released state, and commands the engine 12 to generate a drive force for operating at least one of the first and second electric motors MG1 and MG2 to generate an electric energy. Described more specifically, where at least one of the first and second electric motors MG1 and MG2 is operated to generate an electric energy under the control of the electric motor operation control portion 72 while the vehicle running state determining portion 80 determines that the hybrid vehicle is in the stationary state (held stationary) or in the decelerating state (in the decelerating run), the battery charging control portion 78 commands the clutch engagement control portion 74 to place the clutch CL in the engaged state, commands the brake engagement control portion 76 to place the brake BK in the released state, commands the engine drive control portion 70 to operate the engine 12, and commands the electric motor operation control portion 72 to control at least one of the first and second electric motors MG1 and MG2 to generate the electric energy. In other words, the battery charging control portion 78 is configured to place the drive system 10 in the mode 4 (HV-2), operate the engine 12 to generate an output for operating at least one of the first and second electric motors MG1 and MG2 to generate the electric energy for charging the battery 55.

Where it is determined that the warm-up operation of the hybrid vehicle provided with the drive system 10 is required, the battery charging control portion 78 preferably commands the clutch CL to be placed in the engaged state, commands the brake BK to be placed in the released state, commands the engine 12 to generate a drive force for operating at least one of the first and second electric motors MG1 and MG2 to generate an electric energy. Described more specifically, upon determination by the warm-up operation requirement determining portion 82 that the warm-up operation is required, the battery charging control portion 78 commands the clutch engagement control portion 74 to place the clutch CL in the engaged state, commands the brake engagement control portion 76 to place the brake BK in the released state, commands the engine drive control portion 70 to operate the engine 12, and commands the electric motor operation control portion 72 to control at least one of the first and second electric motors MG1 and MG2, to generate the electric energy. In other words, the battery charging control portion 78 is configured to place the drive system 10 in the mode 4 (HV-2), operate the engine 12 to generate an output for operating at least one of the first and second electric motors MG1 and MG2 to generate the electric energy for charging the battery 55.

Where it is determined that the warm-up operation of the hybrid vehicle provided with the drive system 10 is required, and the hybrid vehicle is required to run, both of the clutch CL and the brake BK are preferably placed in the engaged state, to establish the drive mode in which at least one of the first and second electric motors MG1 and MG2 is primarily used as the vehicle drive power source, that is, to establish the EV drive mode. Described more specifically, where the warm-up operation requirement determining portion 82 determines that the warm-up operation is required while the vehicle running state determining portion 80 determines that the hybrid vehicle is running, the clutch CL is placed in the engaged state under the control of the clutch engagement control portion 74, and the brake BK is placed in the engaged state under the control of the brake engagement control portion 76, while at least one of the first and second electric motors MG1 and MG2 is primarily operated as the vehicle drive power source under the control of the electric motor operation control portion 72. In this case, the engine 12 is not operated, and is held at rest. Namely, the mode 2 (EV-2) indicated in FIG. 3 is established where it is determined that the warm-up operation of the hybrid vehicle provided with the drive system 10 is required while the hybrid vehicle is running. In other words, where it is determined that the warm-up operation of the hybrid vehicle provided with the drive system 10 is required, a region in which the mode 2 (EV-2) indicated in FIG. 3 is established is made larger than (or a shifting map is changed) where it is not determined that the warm-up operation is required (where the hybrid vehicle is in a normal running state).

Figure 10:
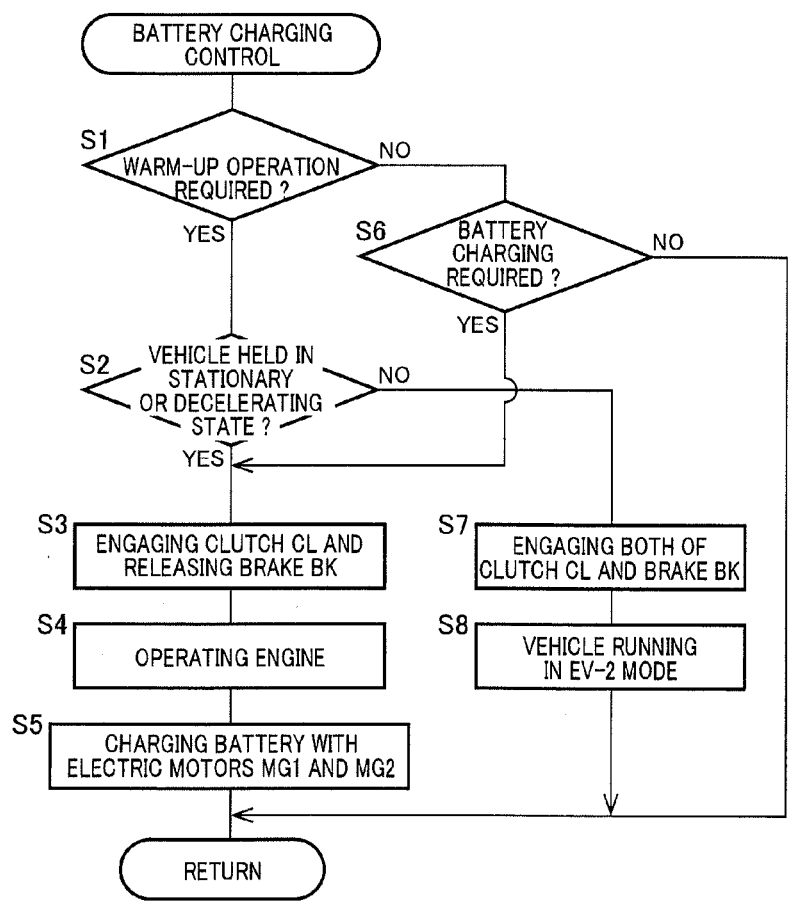
FIG. 10 is a flow chart for explaining a major portion of one example of a battery charging control implemented by the electronic control device of FIG. 2.
Figure 11:
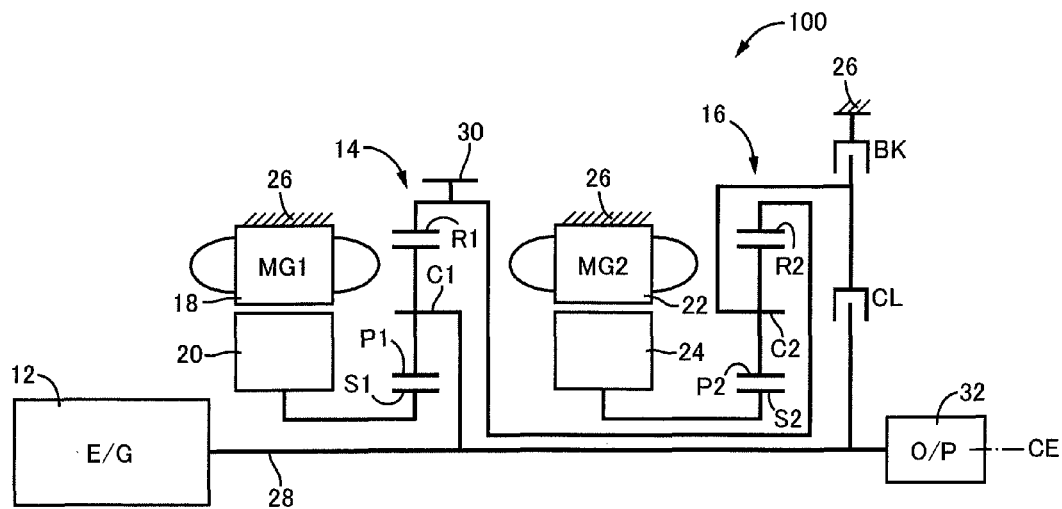
FIG. 11 is a schematic view for explaining an arrangement of a hybrid vehicle drive system according to another preferred embodiment of this invention.
Figure 12:
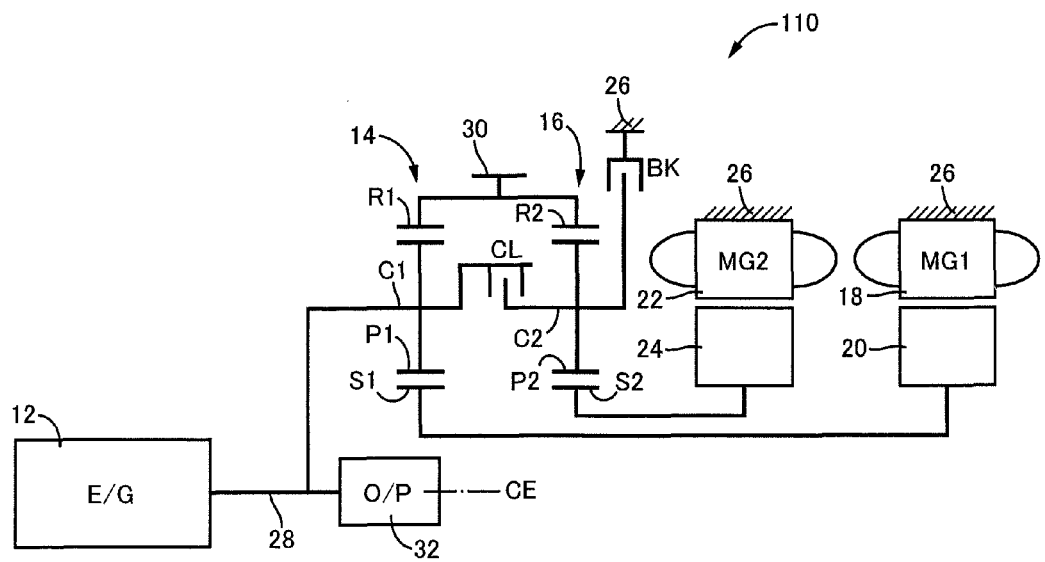
FIG. 12 is a schematic view for explaining an arrangement of a hybrid vehicle drive system according to a further preferred embodiment of this invention.
Figure 13:
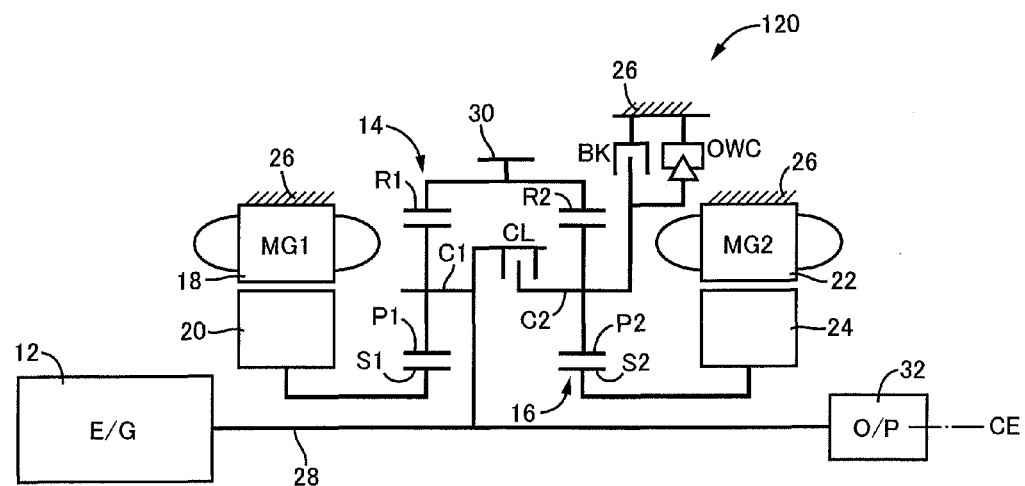
FIG. 13 is a schematic view for explaining an arrangement of a hybrid vehicle drive system according to a still further preferred embodiment of this invention.

FIG. 10 is the flow chart for explaining a major portion of an example of a battery charging control implemented by the electronic control device 40. The battery charging control is repeatedly implemented with a predetermined cycle time.

The battery charging control is initiated with step S1 ("step" being hereinafter omitted), to determine whether the warm-up operation of the hybrid vehicle provided with the drive system 10 is required. For instance, an affirmative determination is obtained in S1, when the ATF temperature $Th_{ATF}$ detected by the ATF temperature sensor 52 is lower than the predetermined threshold value $Th_{ATF\_bo}$, or when the battery temperature $Th_{bat}$ detected by the battery temperature sensor 53 is lower than the predetermined threshold value $Th_{bat\_bo}$. If a negative determination is obtained in S1, the control flow goes to S6. If the affirmative determination is obtained in S1, on the other hand, the control flow goes to S2 to determine whether the hybrid vehicle is in a stationary or decelerating state. For instance, an affirmative determination is obtained in S2, when the vehicle running speed V corresponding to the output speed $N_{OUT}$ detected by the output speed sensor 50 is zero, or when the change rate dV/dt of the vehicle running speed V corresponding to the output speed $N_{OUT}$ detected by the output speed sensor 50 is a negative value. If a negative determination is obtained in S2, the control flow goes to S7. If the affirmative determination is obtained in S2, on the other hand, the control flow goes to S3 to place the clutch CL in the engaged state and to place the brake BK in the released state. Then, the control flow goes to S4 to operate (start) the engine 12 through the engine control device 56. The control flow then goes to S5 to operate the first and second electric motors MG1 and MG2 with the engine 12, for generating an electric energy to charge the battery 55 through the inverter 58. Then, the present routine is terminated. S6 is implemented to determine whether the battery 55 is required to be charged. The requirement may be output when the electric energy amount SOC stored in the battery, which is detected by the battery SOC sensor 54, becomes less than a predetermined threshold value. If a negative determination is obtained in S6, the present routine is terminated. If an affirmative determination is obtained in S6, on the other hand, the control flow goes to S3. S7 is implemented to place both of the clutch CL and the brake BK in the engaged state. Then, the control flow goes to S8 in which the hybrid vehicle is run in the mode 2(EV-2) in which the first and second electric motors MG1 and MG2 are primarily used as the vehicle drive power source. Then, the present routine is terminated.

It will be understood from the foregoing description by reference to FIG. 10 that S4 corresponds to the operation of the engine drive control portion 70, and S5 and S8 correspond to the operation of the electric motor operation control portion 72, while S3 and S7 correspond to the operation of the clutch engagement control portion 74 and the operation of the brake engagement control portion 76, and that S1-S6 correspond to the operation of the battery charging control portion 78, and S2 corresponds to the operation of the vehicle running state determining portion 80, while S1 corresponds to the operation of the warm-up operation requirement determining portion 82.

Other preferred embodiments of the present invention will be described in detail by reference to the drawings. In the following description, the same reference signs will be used to identify the same elements in the different embodiments, which will not be described redundantly.

Second Embodiment

FIGS. 11-16 are the schematic views for explaining arrangements of respective hybrid vehicle drive systems 100, 110, 120, 130, 140 and 150 according to other preferred modes of this invention. The hybrid vehicle drive control device of the present invention is also applicable to drive systems such as the drive system 100 shown in FIG. 11 and the drive system 110 shown in FIG. 12, which have respective different arrangements of the first electric motor MG1, first planetary gear set 14, second electric motor MG2, second planetary gear set 16, clutch CL and brake BK in the direction of the center axis CE. The present hybrid vehicle drive control device is also applicable to drive systems such as the drive system 120 shown in FIG. 13, which have a one-way clutch OWC disposed between the carrier C2 of the second planetary gear set 16 and the stationary member in the form of the housing 26, in parallel with the brake BK, such that the one-way clutch OWC permits a rotary motion of the carrier C2 relative to the housing 26 in one of opposite directions and inhibits a rotary motion of the carrier C2 in the other direction.

Figure 14:
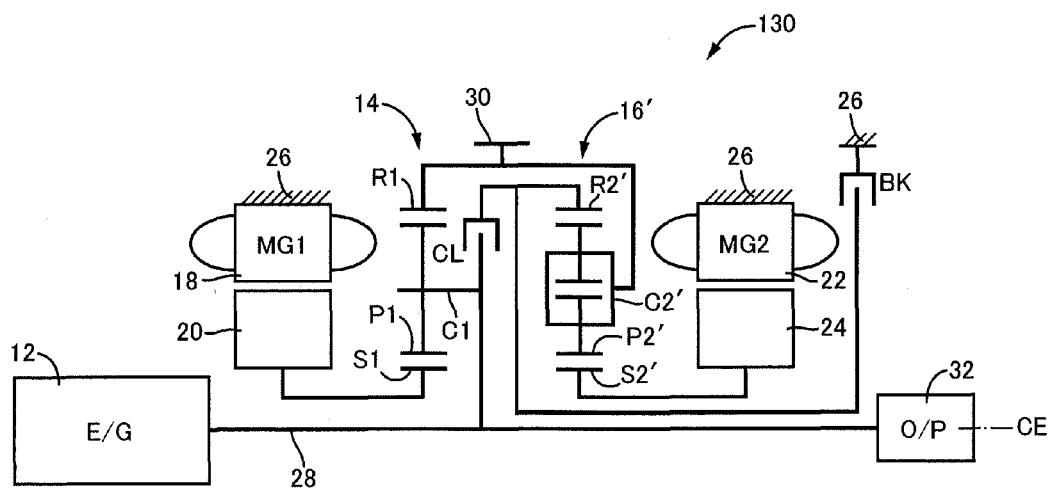
FIG. 14 is a schematic view for explaining an arrangement of a hybrid vehicle drive system according to a yet further preferred embodiment of this invention.
Figure 15:
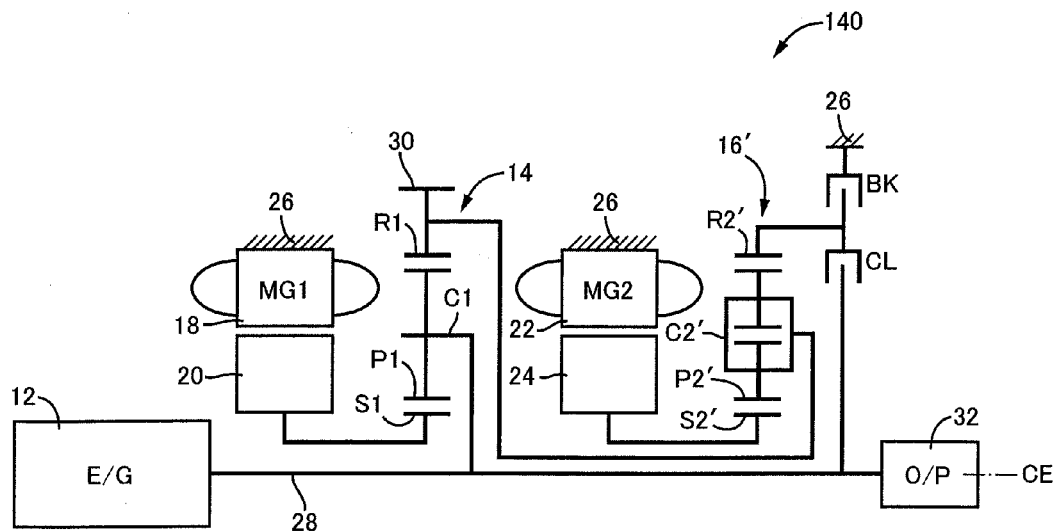
FIG. 15 is a schematic view for explaining an arrangement of a hybrid vehicle drive system according to still another preferred embodiment of this invention.
Figure 16:
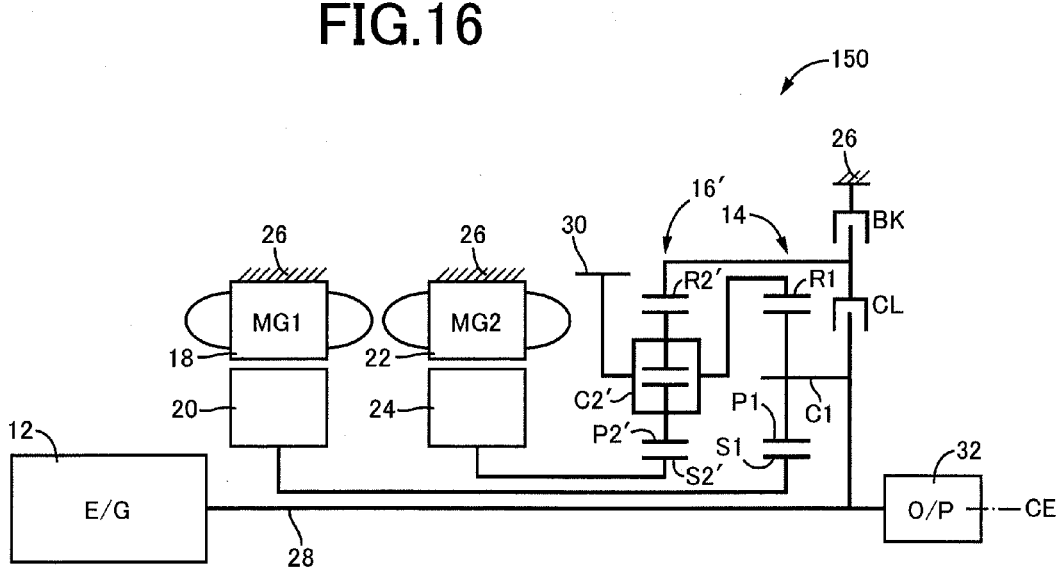
FIG. 16 is a schematic view for explaining an arrangement of a hybrid vehicle drive system according to yet another preferred embodiment of this invention.

The present hybrid vehicle drive control device is further applicable to drive systems such as the drive system 130 shown in FIG. 14, the drive system 140 shown in FIG. 15 and the drive system 150 shown in FIG. 16, each of which is provided with a second differential mechanism in the form of a second planetary gear set 16' of a double-pinion type, in place of the second planetary gear set 16 of a single-pinion type. This second planetary gear set 16' is provided with rotary elements (elements) consisting of: a first rotary element in the form of a sun gear S2'; a second rotary element in the form of a carrier C2' supporting a plurality of pinion gears P2' meshing with each other such that each pinion gear P2' is rotatable about its axis and the axis of the planetary gear set; and a third rotary element in the form of a ring gear R2' meshing with the sun gear S2' through the pinion gears P2'.

Third Embodiment

Figure 17:
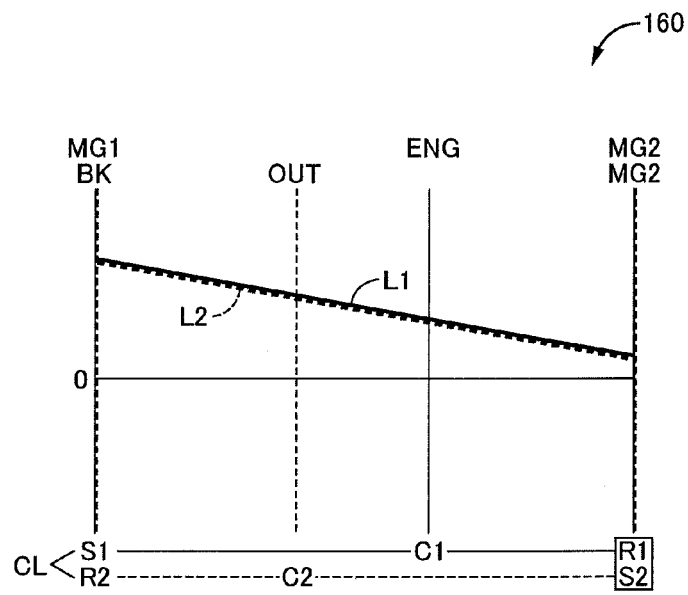
FIG. 17 is a collinear chart for explaining an arrangement and an operation of a hybrid vehicle drive system according to another preferred embodiment of this invention.
Figure 18:
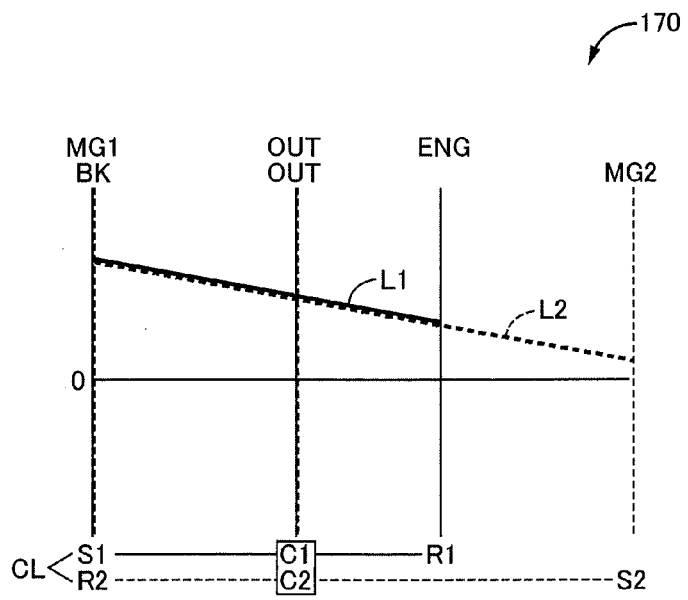
FIG. 18 is a collinear chart for explaining an arrangement and an operation of a hybrid vehicle drive system according to a further preferred embodiment of this invention.
Figure 19:
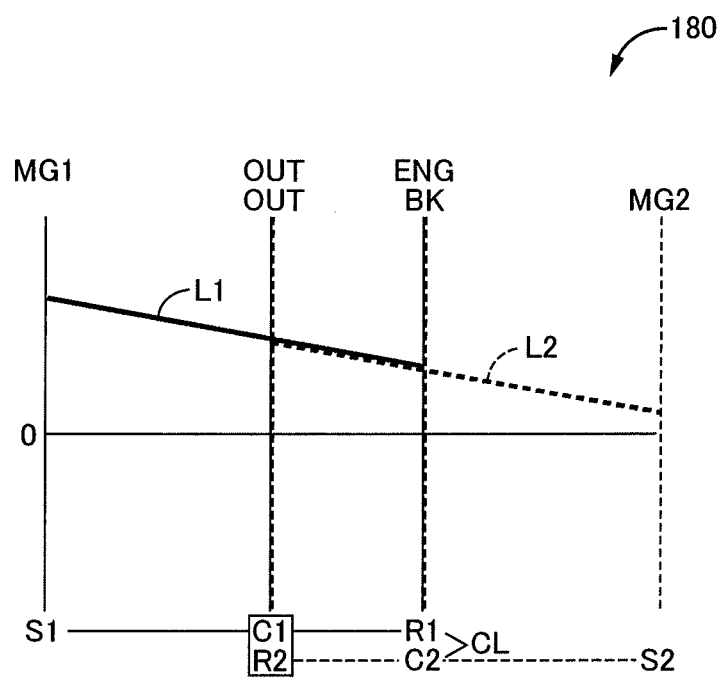
FIG. 19 is a collinear chart for explaining an arrangement and an operation of a hybrid vehicle drive system according to a still further preferred embodiment of this invention.

FIGS. 17-19 are the collinear charts for explaining arrangements and operations of respective hybrid vehicle drive systems 160, 170 and 180 according to other preferred embodiments of this invention in place of the drive system 10. In FIGS. 17-19, the relative rotating speeds of the sun gear S1, carrier C1 and ring gear R1 of the first planetary gear set 14 are represented by the solid line L1, while the relative rotating speeds of the sun gear S2, carrier C2 and ring gear R2 of the second planetary gear set 16 are represented by the broken line L2, as in FIGS. 4-7. In the hybrid vehicle drive system 160 shown in FIG. 17, the sun gear S1, carrier C1 and ring gear R1 of the first planetary gear set 14 are respectively connected to the first electric motor MG1, engine 12 and second electric motor MG2, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. The ring gear R1 and the sun gear S2 are connected to each other. In the hybrid vehicle drive system 170 shown in FIG. 18, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. The carriers C1 and C2 are connected to each other. In the hybrid vehicle drive system 180 shown in FIG. 19, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2, to the housing 26 through the brake BK, and to the output gear 30. The ring gear R1 and the carrier C2 are selectively connected to each other through the clutch CL. The carrier C1 and ring gear R2 are connected to each other.

The hybrid vehicle drive control device of the present invention described above by reference to FIG. 8 and the other figures is suitably applicable to the drive systems shown in FIGS. 17-19. Namely, the clutch CL is placed in the engaged state when at least one of the first electric motor MG1 and the second electric motor MG2 is operated to generate an electric energy. Preferably, when at least one of the first electric motor MG1 and the second electric motor MG2 is operated to generate an electric energy in a stationary or decelerating state of the hybrid vehicle, the clutch CL is placed in the engaged state while the brake BK is placed in the released state, at least one of the first and second electric motors MG1 and MG2 is operated with a drive force of the engine 12, to generate the electric energy for charging the battery 55. This manner of control applied to the drive systems 160, 170 and 180 also permits effective reduction of the length of time required for charging the vehicle driving battery.

The hybrid vehicle drive systems shown in FIGS. 11-19 are identical with each other in that each of these hybrid vehicle drive systems is provided with the first differential mechanism in the form of the first planetary gear set 14 and the second differential mechanism in the form of the second planetary gear set 16, 16', which have four rotary elements (whose relative rotating speeds are represented) in the collinear chart, and is further provided with the first electric motor MG1, second electric motor MG2, engine 12 and output rotary member (output gear 30) which are connected to the respective four rotary elements, and wherein one of the four rotary elements is constituted by the rotary element of the first planetary gear set 14 and the rotary element of the second planetary gear set 16, 16' which are selectively connected to each other through the clutch CL, and the rotary element of the second planetary gear set 16, 16' selectively connected to the rotary element of the first planetary gear set 14 through the clutch CL is selectively fixed to the housing 26 as the stationary member through the brake BK, as in the hybrid vehicle drive system shown in FIGS. 4-7.

As described above, the illustrated embodiments are configured such that the hybrid vehicle is provided with: the first differential mechanism in the form of the first planetary gear set 14 and the second differential mechanism in the form of the second planetary gear set 16, 16' which have the four rotary elements as a whole when the clutch CL is placed in the engaged state (and thus the first planetary gear set 14 and the second planetary gear set 16, 16' are represented as the four rotary elements in the collinear charts such as FIGS. 4-7); and the engine 12, the first electric motor MG1, the second electric motor MG2 and the output rotary member in the form of the output gear 30 which are respectively connected to the four rotary elements. One of the four rotary elements is constituted by the rotary element of the above-described first differential mechanism and the rotary element of the above-described second differential mechanism which are selectively connected to each other through the clutch CL, and one of the rotary elements of the first and second differential mechanisms which are selectively connected to each other through the clutch CL is selectively fixed to the stationary member in the form of the housing 26 through the brake BK. The drive control device is configured to place the clutch CL in the engaged state when at least one of the first and second electric motors MG1 and MG2 is operated to generate an electric energy. Accordingly, the first and second electric motors MG1 and MG2 can cooperate with each other to perform an electricity generating operation, so that it is possible to improve the battery charging efficiency. Namely, the illustrated embodiments provide a drive control device in the form of the electronic control device 40 for a hybrid vehicle, which permits reduction of the length of time required for charging the vehicle driving battery in the form of the battery 55.

The drive control device is configured to place the clutch CL in the engaged state and to place the brake BK in the released state when at least one of the first electric motor MG1 and the second electric motor MG2 is operated to generate an electric energy while the hybrid vehicle is in a stationary or decelerating state. Accordingly, the first and second electric motors MG1 and MG2 can cooperate with each other to perform the electricity generating operation in the stationary or decelerating state of the hybrid vehicle, so that the efficiency of charging of the battery 55 can be improved in a highly practical manner.

The drive control device is configured to place the clutch CL in the engaged state and to place the brake BK in the released state, and to operate at least one of the first electric motor MG1 and the second electric motor MG2 with a drive force of the engine 12, for generating an electric energy, when a warm-up operation of the hybrid vehicle is required. Accordingly, the efficiency of charging of the battery 55 can be improved when the warm-up operation of the hybrid vehicle is required, so that the warm-up operation can be accelerated owing to the efficient charging of the battery 55, whereby the fuel economy can be improved with efficient reduction of a power loss at a low temperature of the working fluid in the automatic transmission.

The drive control device is configured to place the brake BK in the engaged state while the clutch CL is placed in the engaged state, to permit the first electric motor MG1 and the second electric motor MG2 to be primarily used as the vehicle drive power source, when a warm-up operation of the hybrid vehicle is required while the hybrid vehicle is running. Accordingly, the battery can be rapidly discharged when the warm-up operation of the hybrid vehicle is required, so that the warm-up operation can be accelerated, whereby the drivability and fuel economy of the hybrid vehicle can be improved.

The first planetary gear set 14 is provided with a first rotary element in the form of the sun gear S1 connected to the first electric motor MG1, a second rotary element in the form of the carrier C1 connected to the engine 12, and a third rotary element in the form of the ring gear R1 connected to the output gear 30, while the second planetary gear set 16 (16') is provided with a first rotary element in the form of the sun gear S2 (S2') connected to the second electric motor MG2, a second rotary element in the form of the carrier C2 (C2'), and a third rotary element in the form of the ring gear R2 (R2'), one of the carrier C2 (C2') and the ring gear 112 (R2') being connected to the ring gear R1 of the first planetary gear set 14. The clutch CL is configured to selectively connect the carrier C1 of the first planetary gear set 14 and the other of the carrier C2 (C2') and the ring gear R2 (R2') which is not connected to the ring gear R1, to each other, while the brake BK is configured to selectively fix the other of the carrier C2 (C2') and the ring gear R2 (R2') which is not connected to the ring gear R1, to a stationary member in the form of the housing 26. Accordingly, it is possible to reduce the length of time required for charting the battery 55 in the drive system 10 having a highly practical arrangement.

While the preferred embodiments of this invention have been described by reference to the drawings, it is to be understood that the invention is not limited to the details of the illustrated embodiments, but may be embodied with various changes which may occur without departing from the spirit of the invention.

Nomenclature of Reference Signs
10, 100, 110, 120, 130, 140, 150, 160, 170, 180: Hybrid vehicle drive system
12: Engine 14: First planetary gear set (First differential mechanism)
16, 16': Second planetary gear set (Second differential mechanism)
18, 22: Stator 20, 24: Rotor 26: Housing (Stationary member)
28: Input shaft 30: Output gear (Output rotary member)
32: Oil pump 40: Electronic control device (Drive control device)
42: Accelerator pedal operation amount sensor 44: Engine speed sensor
46: MG1 speed sensor 48: MG2 speed sensor 50: Output speed sensor
52: ATF temperature sensor 53: Battery temperature sensor
54: Battery SOC sensor 55: Battery (Vehicle driving battery)
56: Engine control device 58: Inverter 60: Hydraulic control unit
70: Engine drive control portion
72: Electric motor operation control portion
74: Clutch engagement control portion
76: Brake engagement control portion
78: Battery charging control portion
80: Vehicle running state determining portion
82: Warm-up operation requirement determining portion
BK: Brake CL: Clutch C1, C2, C2': Carrier (Second rotary element)
MG1: First electric motor MG2: Second electric motor
OWC: One-way clutch P1, P2, P2': Pinion gear
R1, R2, R2': Ring gear (Third rotary element)
S1, S2, S2': Sun gear (First rotary element)

The invention claimed is:

1. A drive control device for a hybrid vehicle provided with: a differential device which includes a first differential mechanism and a second differential mechanism and which has four rotary elements; and an engine, a first electric motor, a second electric motor and an output rotary member which are respectively connected to said four rotary elements, and wherein one of said four rotary elements is constituted by a rotary component of said first differential mechanism and a rotary component of said second differential mechanism which are selectively connected to each other through a clutch, and one of the rotary components of said first and second differential mechanisms which are selectively connected to each other through said clutch is selectively fixed to a stationary member through a brake, said drive control device comprising:
a clutch engagement control portion configured to place said clutch in an engaged state when a warm-up operation of the hybrid vehicle is required.

2. The drive control device according to claim 1, further comprising a brake engagement control portion configured to place said brake in a released state while said clutch is placed in the engaged state under the control of said clutch engagement control portion when at least one of said first electric motor and said second electric motor is operated to generate an electric energy while the hybrid vehicle is in a stationary or decelerating state.

3. The drive control device according to claim 1, further comprising a brake engagement control portion configured to place said brake in a released state while said clutch is placed in the engaged state under the control of said clutch engagement control portion, when a warm-up operation of the hybrid vehicle is required, and an electric motor operation control portion configured to operate at least one of said first electric motor and said second electric motor with a drive force of said engine, for generating an electric energy, when the warm-up operation of the hybrid vehicle is required.

4. The drive control device according to claim 1, further comprising a brake engagement control portion configured to place said brake in an engaged state while said clutch is placed in the engaged state under the control of said clutch engagement control portion, to permit said first electric motor and said second electric motor to be primarily used as a vehicle drive power source, when a warm-up operation of the hybrid vehicle is required while the hybrid vehicle is running.

5. The drive control device according to claim 1, wherein said first differential mechanism is provided with a first rotary element connected to said first electric motor, a second rotary element connected to said engine, and a third rotary element connected to said output rotary member, while said second differential mechanism is provided with a first rotary element connected to said second electric motor, a second rotary element, and a third rotary element, one of the second and third rotary elements of the second differential mechanism being connected to the third rotary element of said first differential mechanism, and wherein said clutch is configured to selectively connect the second rotary element of said first differential mechanism, and the other of the second and third rotary elements of said second differential mechanism which is not connected to the third rotary element of said first differential mechanism, to each other, while said brake is configured to selectively fix the other of the second and third rotary elements of said second differential mechanism which is not connected to the third rotary element of said first differential mechanism, to said stationary member.

\* \* \* \* \*